United States Patent Office 3,301,906
Patented Jan. 31, 1967

3,301,906
OXIDATION OF ISOBUTYLENE TO METHACROLEIN
Alfio J. Besozzi, Skillman, and William F. Brill, East Brunswick, N.J., assignors to Petro-Tex Chemical Corporation, Houston, Tex., a corporation of Delaware
No Drawing. Filed June 27, 1963, Ser. No. 290,911
5 Claims. (Cl. 260—604)

This invention relates to an improved process for the oxidation of isobutylene to form methacrolein.

Elemental copper and its oxides have been used as catalysts to oxidize olefins, particularly olefins containing three or less carbon atoms to form oxygenated compounds. In the oxidation of olefins containing four or more carbon atoms, such as isobutylene to form methacrolein, the use of a copper base catalyst normally requires that the oxidation process be conducted at temperatures between about 200° C. to 400° C. At these low temperatures long contact times are required. Use of higher temperatures is ineffective in improving methacrolein yields because the reaction is difficult to control and undesirable combustion products are formed. This uncontrolled oxidation can be minimized to some extent by using very large amounts of diluents in the reaction zone. However, this technique drastically reduces the space time yields, generally causes additional problems in the separation and purification of the final product, and is generally unsatisfactory. Prior to this invention, because of these operational difficulties, use of a copper base catalyst was limited to the oxidation of olefins containing less than four carbon atoms.

It is an object of this invention to provide a high temperature process for producing methacrolein from isobutylene in high yields. Another object of this invention is to provide a high temperature process for producing methacrolein from isobutylene over a copper catalyst which requires a minimum use of diluent and in which uncontrolled oxidation of the olefin feed is avoided. These objects are accomplished by reacting isobutylene with oxygen in the presence of certain sulfur compounds over a copper-phosphorus catalyst.

The sulfur compound that is utilized may be any inorganic sulfur compound containing at least two atoms of hydrogen or oxygen. Hydrogen sulfide and sulfur dioxide are extremely effective in controlling the high temperature oxidation of isobutylene. The amounts of these sulfur compounds required in controlling this oxidation reaction may be varied from about 0.001 to 0.1 mol equivalent of sulfur to one mol of isobutylene, and preferably between 0.01 and 0.05 mol equivalent of sulfur has been utilized to advantage. Although the sulfur compound is generally added to a mixture of isobutylene and oxygen prior to their introduction into the reaction zone, the sulfur compound, as well as the oxygen, isobutylene and diluent, may be added individually into the reaction zone.

The amount of oxygen used will vary over narrow limits. While amounts between about 0.1 and 3.0 mols of oxygen per mol of isobutylene have been utilized, amounts between about 0.5 and 1.2 mols of oxygen are preferred. The oxygen may be added as pure oxygen or as air. The choice of oxygen ratio will generally depend upon the operational conditions of reaction and particularly upon the choice of reaction temperature. Normally the amount of oxygen used will be decreased as the temperature of reaction is increased.

Temperatures between about 450° C. and 700° C. have been useful in producing methacrolein from isobutylene and temperatures ranging from about 500° C. to 650° C. are preferred. These operational temperatures are hot spot temperatures or the highest temperature in the reaction zone. One of the advantages of this invention is in the use of relatively high set temperatures without incurring an uncontrolled oxidation reaction. Set temperatures may be defined as the fixed temperature of the reaction zone prior to the introduction of the oxidation reactants. In the past when set temperatures of 400° C. were utilized in oxidizing isobutylene over a copper type catalyst a runaway or uncontrolled exothermic oxidation reaction generally resulted along with low yields of desired product. In contrast and in accordance with this invention, set temperatures of 400° C. and even set temperatures of 500° C. and higher may be employed without initiating a runaway or an uncontrollable oxidative reaction. For example, methacrolein yields of 70 mol percent and even higher, based on the amount of isobutylene converted, may be obtained in accordance with this invention without producing substantial quantities of combustion products.

The amount of diluent used even at high set temperatures is small compared to amounts normally required when a sulfur compound is not used in the reaction. Although the amount of diluent added may be as low as one mol of inert diluent per mol of isobutylene to as high as 30 mols of diluent per mol of isobutylene, the latter amount is unnecessary and an amount less than 10 mols is normally satisfactory. Generally the diluent utilized will be an amount such that the total amount of isobutylene present in the total reaction mixture will not be less than 10 mol percent of the total reaction mixture. Rich isobutylene streams of 10 to 30 mol percent based on the total volume of the reaction mixture have given excellent yields of methacrolein even at high operating temperatures. Diluents that may be utilized in this invention include any inert material that will not react with the feed, reactants or reaction products. Diluents such as helium, nitrogen, carbon dioxide, steam, methane, and the like have been used to advantage. Steam is preferred.

The contact times required in the operation of this invention are much shorter than those normally required in high temperature oxidation reactions of this type. Contact times as low as 0.005 second to one second have been utilized to advantage; however, contact times between 0.05 second and 0.5 second are preferred. The lower the contact time, the higher are the space time yields.

Space time yields are defined as the ratio of product yield per unit volume of catalyst per unit time. Space time yields as high as 574 grams/liter/hour of methacrolein from isobutylene have been obtained by the process of this invention with little loss of olefin feed. Without the addition of sulfur compounds, space time yields of methacrolein greater than 40 grams/liter/hour could be obtained over a copper catalyst only by increasing the set temperature to temperatures above 400° C. However, at these increased temperatures an uncontrollable oxidation reaction resulted and large quantities of feed material were converted to combustion products.

The catalyst employed in this invention is a copper phosphate type catalyst. The catalyst actives may be prepared by combining copper atoms in the form of copper salts, oxides, and hydroxides with phosphorus atoms in the form of its acids, oxides, or salts which are then heated for form oxides and phosphates. Normally, copper will be present in the catalyst mixture in excess of the phosphorus. While atomic ratios of copper to phosphorus of less than 1:1 have been used, normally ratios greater than 1:1 to less than 10:1 are used. Ratios of copper atoms to phosphorus atoms in the catalyst of about 1:1 to about 3:1 are preferred. Specific methods of preparing the copper phosphorus catalyst include reaction of a copper sulfate with sodium pyrophosphate in aqueous solution; reacting cupric oxide with concentrated phosphoric acid; reacting phosphorus pentoxide with either a cuprous or cupric hydroxide; by evaporating a solution of cupric nitrate and phosphoric acid onto a support and heating, and the like. Such catalysts may contain mixtures of copper phosphates and copper and phosphorus oxides. Some of the catalysts so prepared initially contain a mixture of copper orthophosphates, copper pyrophosphates, copper metaphosphates, cuprous and cupric oxides. The preferred catalyst will comprise atoms of copper, phosphorus and oxygen. During the oxidation reaction and in the presence of sulfur compounds the copper-phosphorus catalyst may undergo additional chemical changes, such as the formation of copper orthophosphates but these changes have no apparent adverse effect on the oxidation reaction.

The catalyst actives may be deposited on a variety of catalyst supports such Alundum, quartz chips, alumina balls, silica, silicon carbide, and other well known catalyst supports. The catalyst actives comprising a mixture of copper and phosphorus atoms may be deposited on the catalyst supports from aqueous slurries or the support may be impregnated as from salt solutions and then heated in the presence of oxygen. If desired, the catalyst may be pelletized and utilized without a support; however, the use of a catalyst support facilitates the catalyst preparation and is usually preferred. A catalyst of 6.29 weight percent cupric oxide and 3.71 weight percent phosphoric pentoxide deposited on 90 weight percent of an alumina support has given excellent yields of methacrolein at a set temperature of 620° C. The amount of actives may be varied widely but usually will be from about one to 25 weight percent and more normally about 5 to 15 weight percent.

A variety of reactors may be used in the practice of this invention. Generally large diameter tubular reactors which can be easily charged and emptied of catalyst are preferred. Tubular reactors of small diameter may also be used. Any desired reactor that can be efficiently operated without creating excessive flow restrictions or back pressures may be used and good results obtained. A fluidized bed type reactor may also be advantageously used with minor modifications in the operation of this invention.

Specific embodiments are set forth in the following examples. Percent conversion refers to the mols of isobutylene consumed per 100 mols of isobutylene fed to the reactor, and percent yield refers to the mols of methacrolein formed per 100 mols of isobutylene fed. All runs reported in the examples were made in a stainless steel reactor having an internal diameter of 22 mm. and being approximately 24 inches in length. Heat was supplied to the reactor by means of strip heaters vertically placed about the stainless steel block reactor. Usually the uppermost part of the reactor was used empty as a preheat section for the reaction zone which was located directly below the preheat section. The reactants were metered by calibrated rotameters into a manifold located at the top of the reactor. The reactants were preheated in the preheat section of the reactor and then passed into the reaction zone of the reactor. The hot effluent gases were sampled through sampling ports located just below the heated section of the reactor by means of an insulated syringe heated to a temperature of 160° C. In analyzing the effluent stream, two chromatographic samples were generally taken, one of which was analyzed for the methacrolein produced while the second was analyzed for the gases, oxygen, nitrogen, and carbon monoxide.

*Example 1*

A catalyst was prepared by depositing on 315 grams of Alundum support having a Tyler screen size of from 10 to 12 with a mixture of an aqueous solution containing 41.7 grams of $Cu(NO_3)_2 \cdot 3H_2O$ and 11.2 grams of commercial $H_3PO_4$. The mixture was evaporated to dryness under a vacuum in a rotating tumbler which was maintained at a temperature of between 65° C. to 75° C. After the catalyst was completely dry, the catalyst fines were removed by sifting. The catalyst was then placed in a tube and conditioned at 550° C. in the presence of oxygen for about 16 hours. 13.3 cc. of this prepared catalyst was then placed in the lowermost portion of the stainless steel reactor tube and heated to a temperature of about 500° C. A 19 inch section located above the catalyst bed was left empty and utilized as a preheat zone. A mixture consisting of 10 percent by volume of isobutylene, 7.5 percent by volume of oxygen, 82.0 percent by volume of steam, and 0.5 percent by volume of hydrogen sulfide was passed through the reactor. The contact time was 0.09 second. The hot spot or reaction temperature was approximately 600° C. Chromatographic analysis of the hot effluent indicated that a methacrolein yield of 72.7 percent based on the isobutylene consumed was obtained. The space time yield for this example was calculated to be 470 grams/liter/hour.

*Example 2*

Example 1 was repeated with the exception that sulphur dioxide was substituted for the hydrogen sulfide. In this run a methacolein yield of 68.1 percent was obtained. The calculated space time yield for this example was 574 grams/liter/hour.

*Example 3*

Example 1 was repeated in the absence of a sulphur compound. Analysis of the hot reactor effluent indicated that only 20.4 percent of the isobutylene introduced was consumed and that 47.8 percent of the isobutylene was converted to methacrolein. A set temperature of 500° C. was employed in this example with a hot spot or reaction temperature of 660° C. Upon completion of this run the catalyst was examined and was found to be coated with carbon and coke and large quantities of combustion products were obtained. In contrast, there was no indication of catalyst coking or carbon deposits in Example 1 or Example 2, nor was there an excessive amount of CO or $CO_2$ formed.

We claim:

1. A process for the vapor phase production of methacrolein which comprises contacting a mixture of isobutylene and oxygen in a molar ratio of one mol of isobutylene to 0.1 to 3 mols of oxygen at an elevated temperature in the range of about 450° C. to 750° C. with a catalyst containing atoms of copper and phosphorus in an atomic ratio of 1 to 1 to 10 to 1 in the presence of a sulfur compound containing at least two atoms selected from the group consisting of hydrogen and oxygen present in an amount to provide from 0.001 to 0.1 mol equivalent of sulfur per mol of isobutylene, for about 0.005 to 1 second.

2. A process for the vapor phase oxidation of isobutylene to form methacrolein which comprises contacting a mixture of isobutylene and oxygen in a molar ratio of 0.1 to 3 mols of oxygen per mol of isobutylene and a sulfur compound selected from the group consisting of hydrogen sulfide and sulfur dioxide present in amount equivalent to between about 0.001 to 0.1 mol of sulfur per mol of isobutylene at a temperature between about 450° C. and 700° C. with a copper phosphate catalyst containing copper and phosphorus atoms in an atomic ratio of 1 to 1 to 10 to 1, for 0.005 to 1 second.

3. A process for the vapor phase production of methacrolein which comprises contacting an isobutylene mixture comprising about 0.5 to 3 mols of oxygen per mol of isobutylene at temperatures between about 450° C. to 650° C. with a copper phosphate containing copper and phosphorus atoms in an atomic ratio of from 1 to 1 to 3 to 1 catalyst in the presence of sulfur dioxide in amounts equivalent to between about 0.01 to 0.05 mol of sulfur per mol of isobutylene, for 0.05 to 0.5 second.

4. A process for the vapor phase production of methacrolein which comprises contacting an isobutylene mixture comprising about 0.5 to 3 mols of oxygen per mol of isobutylene at a temperature between about 450° C. and 650° C. with a copper phosphate containing copper and phosphorus atoms in an atomic ratio of from 1 to 1 to 3 to 1 catalyst in the presence of hydrogen sulfide in amounts equivalent to between about 0.01 to 0.05 mol of sulfur per mol of isobutylene, for 0.05 to 0.5 second.

5. A process for the vapor phase oxidation of isobutylene to methacrolein which comprises contacting at a temperature between about 500° C. and 650° C. over a copper phosphate catalyst containing copper and phosphorus atoms in an atomic ratio from 1 to 1 to 10 to 1 a mixture containing oxygen and isobutylene in a molar ratio of 0.5 to 1.2 mols of oxygen per mol of isobutylene and 0.01 to 0.05 mol equivalent of a sulfur compound selected from the group consisting of hydrogen sulfide and sulfur dioxide, said isobutylene being present in a concentration of about 10 to 30 mol percent, for 0.005 to 1 second.

References Cited by the Examiner

UNITED STATES PATENTS

| | | | |
|---|---|---|---|
| 2,807,647 | 9/1957 | Cheney et al. | 260—604 |
| 3,009,960 | 11/1961 | Shotts et al. | 260—604 |

FOREIGN PATENTS 605,502   10/1961   Belgium.

LEON ZITVER, *Primary Examiner.*

J. J. SETELIK, *Assistant Examiner.*